June 28, 1966   C. R. HANNA   3,258,258
VEHICLE STABILIZER, AND TILTER MEANS
Filed June 24, 1963
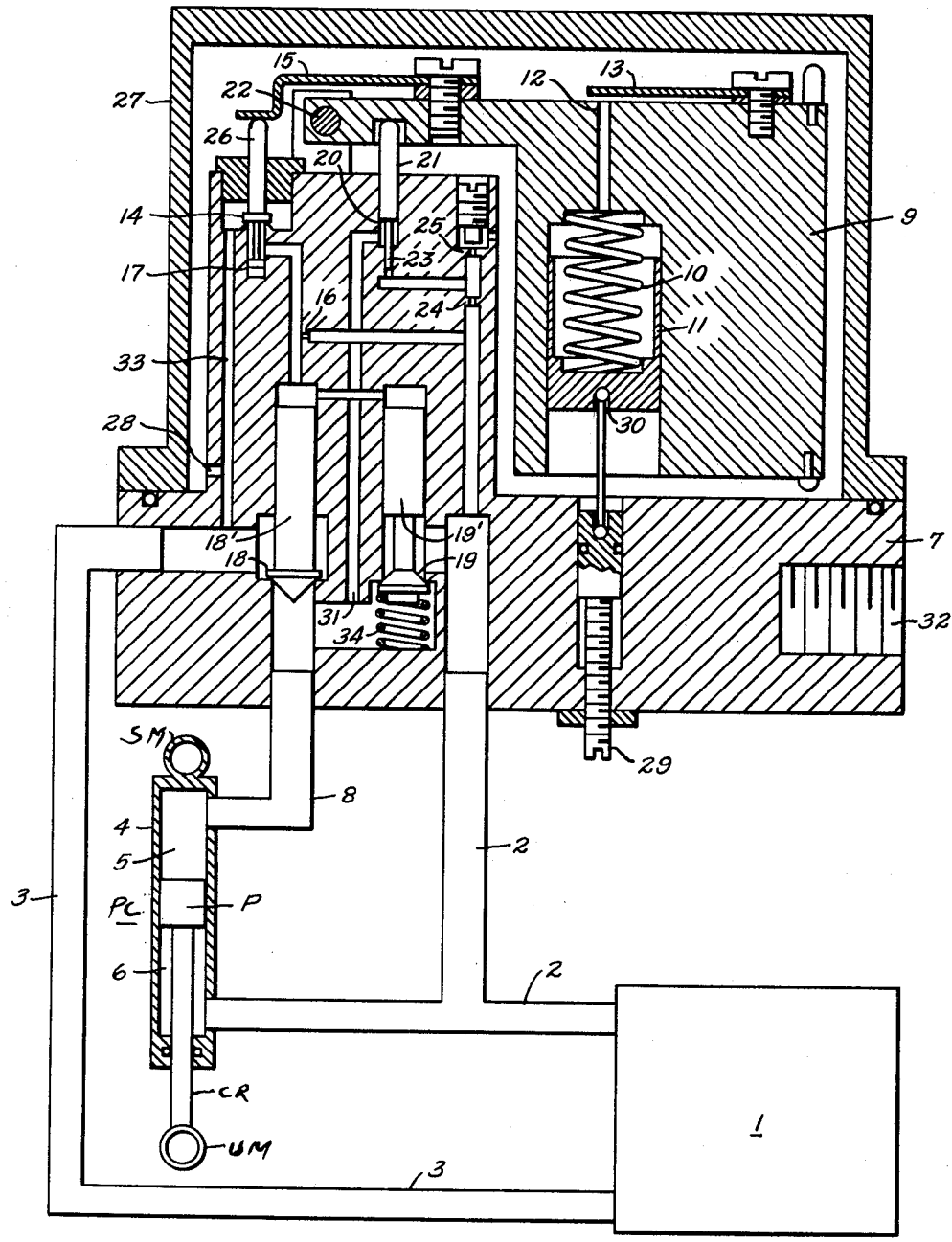
WITNESSES
Robert C. Baird
INVENTOR
CLINTON R. HANNA.
BY
Paul E. Friedemann
ATTORNEY

United States Patent Office

3,258,258
Patented June 28, 1966

3,258,258
VEHICLE STABILIZER, AND TILTER MEANS
Clinton R. Hanna, 2756 NE. 37th Drive,
Fort Lauderdale, Fla.
Filed June 24, 1963, Ser. No. 290,083
12 Claims. (Cl. 267—11)

The invention relates to stabilizer and tilter means for application to vehicles to reduce the disturbances reaching the body member and thus improve the riding comfort. The present invention combines the performance functions of the better devices described in the prior art with considerable improvement as to simplicity. Also new performance features are included without added complication.

Hydraulic power is employed under proper control in the shock absorbers of the vehicle to provide great resistance to the body movements and at the same time to reduce the resistance to the wheel movements. A small control mass, responding to disturbances at the vehicle body, controls hydraulic valve means in such a way as to produce pressure changes in the shock absorber to develop forces which reduce such disturbances. The same control mass, responding to lateral acceleration of the vehicle body, causes the body to bank when rounding curves.

Certain practical elements of the invention limit the range of frequency response of the controller to the essential vehicle suspension frequencies so as to prevent self sustained parasitic oscillations at very high frequencies. Other practical features make possible a stabilizer of such simplicity and low cost as to be attractive commercially. These, thus generally stated, are the objects of the present invention.

More specifically stated it is, therefore, an object of this invention to present a simple vehicle stabilizer which greatly reduces the disturbances reaching the body of the vehicle and which banks the body when the vehicle is made to negotiate turns.

Another object of the invention is to provide a power stabilizer for a vehicle with a pilot valve controlled by a control mass through an intervening linear spring, with damping means for the control mass and separate damping means for the pilot valve.

It is still another object of this invention to provide a power stabilizer with a pilot valve controlled by its control mass through an intervening linear spring so as to increase the required movement of the control mass and therefore increase its delay in controlling the pilot valve.

A further object of the invention to provide a power stabilizer with a simple single seated pilot valve which covers substantially the full range of pressure control linearly with movements of its control mass.

Another object of the invention is to provide a power stabilizer with a two stage inertia controlled valve system, the first stage of which is a single seated valve covering substantially the full range of the supply pressure and made linear by an intervening spring.

A further object of the invention is to provide an inertia controlled valve for a power stabilizer which is responsive only to output pressures.

Another object of the invention is to provide an inertia controlled valve for a vehicle stabilizer which is not appreciably affected by variations of pressure of either the supply line or the return line of its power source.

Still another object of the invention is to provide an inertia controller for a power stabilizer which determines pressures above and below a quiescent pressure, the quiescent pressure always bearing a fixed ratio to the pressure of the power source.

A further object of the invention is to provide a simple inertia controller for a power stabilizer for a vehicle with only three hydraulic connections, one, to the power cylinder, a second, to the power supply line, and, a third, to the power return line.

It is another object of the invention to provide a power stabilizer with a resilient support for its pivoted control mass so disposed with respect to the pivot that variations of the force of the resilient support are compensated by opposite variations of the leverage of the support.

Still another object of the invention is to provide an inertia controller for a power stabilizer for a vehicle which responds only to frequencies in the range of the vehicle suspension frequencies.

Other objects, purposes, and features of the invention will become obvious from the following description:

The single figure shows all the essential components of the present invention.

The hydraulic power source 1 has pressure supply line 2 and return line 3. Ordinarily the source will include a hydraulic pump, an accumulator for storing energy, and a low pressure sump for the return of fluid. A plurality of power cylinders, or actuators, such as PC are connected between the sprung and unsprung masses of the vehicle at several positions on the vehicle, as at the general regions of the four wheels of the vehicle. The cylinder 4 is connected at SM to the sprung mass and the piston P, through its connecting rod CR, is connected at UM to the unsprung mass.

Each cylinder 4 has chambers 5 and 6, usually two to one in transverse sectional area ratio, with chamber 6, having the smaller transverse sectional area, being connected directly to the pressure supply line 2. The chamber 5, with the larger transverse sectional area, is connected to the inertia controller 7 through the hydraulic line 8 and is subject to variations of pressure as determined by the controller. The inertia controller 7 is mounted on the sprung mass. This chamber 5 is the only chamber subjected to pressure variations, a feature which gives much of the simplicity to the new arrangement. With a two to one ratio of areas for actuation on the piston P in cylinder 4 between the chambers, 5 and 6, the quiescent pressure in chamber 5 is one half of the system pressure, whereby no force is produced by the actuator PC. Then as the pressure in chamber 5 is increased the force on the vehicle body, or sprung mass, will be upward while as the pressure in chamber 5 is decreased the force on the body will be downward.

If it is desired that the quiescent force of the actuator PC be upward on the vehicle body instead of zero, the effective area for actuation on piston P of the lower chamber 6 would be chosen less than one half of the effective area of the upper chamber 5. In fact if great support of the body is wanted the annular, or effective, area of the chamber 6 for pressure actuation on piston P could be made zero, for which case there would be no need for the direct connection of the supply line 2 to the cylinder 4. For any such choice the variations of pressure in the upper chamber 5, as determined by the controller 7, the actuator PC will still produce the required stabilizer action for improving the ride of the vehicle.

A plurality of inertia controllers 7 are mounted on the vehicle body usually at positions near the hydraulic actuators PC by bolting into the threaded hole 32. Certain elements of the controller are shown in schematic form so that all the hydraulic passages may be pictured together. Those skilled in the art will readily be able to provide the needed fittings for assembly of the several valves and orifices together with practical methods of providing passages for their interconnection. Actual mechanical designs are about as simple as the showing in the figure. The controller 7 includes the floating mass 9 which rotates through a small angle about the pivot 22. A ball bearing or a spring hinge may be substituted for the pivot 22 to obtain lower friction. The center of gravity of the mass 9 is displaced both horizontally and vertically from the pivot 22 for response to vertical as well as horizontal accelerations. It is supported against gravity by the helical spring 10 and heavily damped by the dash pot 11. The dash pot has associated with it the variable orifice 12 which is made to have substantially constant resistance to fluid flow over a wide range of fluid temperatures and viscosities by the bi-metal thermostatic member 13.

The pilot valve 14 is controlled by the control mass 9 through the intermediate linear spring 15, i.e. one whose force is proportional to its deflection. The spring 15 accomplishes two important functions: it filters out high frequency disturbances above the useful frequencies of the vehicle suspension, which useful frequencies usually are from zero to about twelve cycles per second; and because its deflections are several times the excursions of the pilot valve 14, any non-linearity of pressure vs. deflection of the pilot valve is greatly reduced when translated into excursions of the control mass 9.

The spring 15 accomplishes the foregoing because the control mass 9 must move not only to change the position of the pilot valve 14 but additionally to deflect the spring 15 sufficiently to apply force to the valve 14. The excursions of the control mass 9 are therefore the sum of the valve movement plus the spring deflection. The greater travel causes delay in the control of the pilot valve 14 making the controller less sensitive to the higher frequencies above the vehicle suspension frequencies and preventing the occurrence of parasitic oscillations. The larger travel could of course have been obtained by placing the control mass 9 at a larger radius from the pivot 22. The use of the spring 15 for this purpose, however, has the added merit of linearizing the curved characteristic of the pilot valve. In fact the correction of non-linearity is such that the simple single seated pilot valve can now control the full range of pressure of the power source whereas previous devices permitted the pilot valve to cover only half the range with linearity. The full range coverage permits the use of simple 1:1 power valves instead of 2:1 power valves previously employed.

The pilot valve 14 is fed from the supply line 2 through the orifice 16. Return from the pilot valve 14 is through the duct 33 and the line 3. A small dash pot 17 is provided to damp the pilot valve 14 because the presence of the intermediate spring 15 would otherwise allow high frequency singing of the pilot valve without moving the control mass 9 relative to its dash pot 11. The average pressure under the pilot valve 14 also occurs under the piston of the small dash pot 17 so that the whole seat area of the pilot valve is subject to the control pressure. Clearance around the dash pot piston 17 serves as the orifice. Constant damping is not required here, and so no thermostatic control is provided.

The pilot valve controlled pressure, or pilot pressure, actuates the pistons 18' and 19' at the top of power valves 18 and 19 which in turn regulate the discharge and inflow of fluid from and to the chamber 5. The return from the discharge valve 18 is through the line 3, while the supply to the inlet valve 19 is from the line 2. Both power valves have a 1:1 ratio as stated above and are very simple. The spring 34 holds the inlet valve 19 closed with a very small force for priming purposes and has only a minor effect upon the controlled pressure. The power valves 18 and 19 have flow resistance so that the pressure in the chamber 5 differs from the pilot pressure by an amount proportional to the flow of fluid into and out of chamber 5. The result is a force at the actuator PC proportional to the relative velocity of the sprung and unsprung masses. The power valves are sized to cause this resistance to fluid flow to be the correct value to damp the resonance between the unsprung mass and the tire of the vehicle.

This value of resistance to fluid flow is insufficient to damp the resonance of the sprung mass and the vehicle springs, especially since the effect of the acceleration response of the controller is to augment the value of the sprung mass several fold. To provide enough damping for the body resonance a positive feed back of the pressure in chamber 5 is applied through the duct 31 to the annular area 20 of the piston 21 which acts upon the weight lever arm at the opposite side of the pivot 22 from the pilot valve 14. This combined with the negative feed back of pilot pressure on the area below the pilot valve 14 represents a feed back of the pressure drop through the power valves with the result that the power valve resistance is multiplied. The annular area 20 is slightly less than the the area under the pilot valve 14, so that the positive feed back is smaller than the negative feed back.

The small stem area 23 of the lower end of piston 21 is subjected to a constant pressure which is made equal to the desired quiescent pressure in the chamber 5. Ordinarily this will be chosen half of the supply pressure, the artificially determined pressure being obtained by fixed and adjustable divider orifices 24 and 25 which are fed by the supply line 2. The small piston 23 is therefore a means of compensating the average difference of the moments due to the pilot pressure acting upon the pilot valve area and the pressure in chamber 5 acting upon the annular area 20. Once the pressure between the divider orifices 24 and 25 is adjusted, it will thereafter bear a fixed ratio to the pressure in the supply line 2.

The arrangement and choice of sizes of the various components of the pilot valve and compensating system permit complete balance so that whatever the supply or return line pressures may be there will be no change in moment about the control mass pivot 22 and therefore no force effect upon the pilot valve 14 under quiescent conditions. The exposed area at the top of the piston 21 is made equal to the seat area of the pilot valve 14 as is also the stem area 26 at the top of the pilot valve. If these exposed stems are placed at equal radii from the pivot 22 there will be no net torque under quiescent conditions, because the pilot pressure, the upper chamber 5 pressure, and the compensating pressure are all just half of the system pressure. Balance occurs for all values of system pressure, therefor. Likewise the pressure within the case 27, which is the same as the return line pressure because of the connecting duct 28, acts upon equal areas 21 and 26 at equal radii, and has zero moment under all conditions. If the balance of the control mass 9 by the gravity spring 10 is adjusted by the screw 29 so that the quiescent pressure in chamber 5 is half of the system pressure it will remain so.

The complete absence of response of the controller element to either supply line or return line pressure variations is largely responsible for the small number of connections to the controller. Previous arrangements have required as many as six connections. The present device needs only three connections, two to the power source and one to the actuator. This fact makes for easy installation as well as servicing of the system.

The position of the pivoted support point 30 under the dash pot 11 and the gravity spring 10 of the control mass 9 is purposely chosen below the level of the pivot 22 of the control mass in order to obtain compensation for the varying force of the gravity spring as the control mass is deflected from its mean position. It is seen that the strut supported point 30 moves to the left as the weight moves downward. This shortens the lever arm of the supporting force in toggle fashion so that the change in moment of the supporting force due to the increase in spring deflection is less than it would have been. It is possible by careful design to obtain complete compensation so that little or none of the force variations due to acceleration of the control mass are dissipated in the deflection of the gravity spring. Most or all of the force will therefore be available to act upon the pilot valve 14 through the intervening linear spring 15.

The basic response of the stabilizer is to accelerations of the body. For the vertical response the control mass 9 commands pressures in the cylinder 5 to produce forces proportional to body acceleration which have the effect of increasing the apparent mass of the vehicle body several fold. This is because the cylinder forces oppose the acceleration of the body, reducing the acceleration to a low value as would be the case if the body mass were very great. It is proper then to think of the stabilizer as having the properties of a synthetic mass. One of the most important attributes of the synthetic mass is that it reduces the basic resonance frequency of the body of the vehicle on its springs. In practical designs this reduction of frequency is of the order of 2½:1. Such a result would be possible with reduction of the stiffness of the suspension springs, but only if the stiffness reduction were 6¼:1. This is hardly feasible even with air springs with leveling devices. About the best that has been achieved to date with air springs is of the order of two to one in stiffness or 1.4:1 in frequency. The above gain with the inertia controlled stabilizer represents a considerable advance, and does not require any leveling device unless very large load variations are to be encountered.

To understand the detailed operation of the stabilizer as it acts to reduce vertical disturbances of the body of the vehicle, consider the case where a sudden depression of the road is encountered. As the wheel moves downward the vehicle spring extends and reduces its support of the body. The resulting downward acceleration of the body acts upon the controller 7 causing the mass 9 to lag upward, closing the pilot valve 14. This closure causes the pilot output pressure to increase and in turn to hold the power inlet valve 19 open with greater force so that fluid under pressure is admitted to the upper chamber 5. The power discharge valve 18 is simultaneously held closed to withstand the increase in chamber pressure. The downward acceleration of the body is greatly reduced by the resulting actuator force; but, equally important, the wheel of the vehicle is accelerated downward in the direction it should be moving to maintain road contact.

Now consider the opposite condition where the vehicle encounters a rise in the road contour. As the wheel rises the vehicle spring is compressed and the body is accelerated upward. The mass 9 of the controller lags downward opening the pilot valve 14 to reduce its output pressure. The power discharge valve 18 now commands a lower pressure in the chamber 5 with the result that the net actuator force on the body is downward thus resisting the upward acceleration. The wheel is at the same time helped in its upward movement over the rise of the road. No matter what force arises to disturb the vehicle body the controller 7 calls for pressures in the chamber 5 of the actuator PC which produce the required forces to reduce the body disturbance.

Next consider the operation of the stabilizer as it banks the body of the vehicle when negotiating turns. The controller as shown would be mounted on the right side of the body. Now as the vehicle turns to the right, the acceleration of the body to the right will cause the center of gravity of the control mass 9 to lag to the left. This will rotate the control mass clockwise about the pivot 22 opening the pilot valve 14 to command a lower pressure in the chamber 5, and the right side of the body will be pulled downward to bank it into the turn. When a left turn is made the acceleration of the vehicle to the left will cause the center of gravity of the mass 9 to lag to the right, rotating the mass 9 counterclockwise about the pivot 22 thus closing the pilot valve 14 to command higher pressure in the chamber 5, and the right side of the body will be pushed upward to bank it into the turn. It is readily seen that by reversing the controllers left to right for mounting on the left side of the body, the above turns to the right and then to the left will cause the left side of the body to be raised and lowered respectively, thus complementing the banking described for the right side of the body.

In all of the performance conditions described, the acceleration response is supplemented by the relative velocity response due to the resistance to flow of fluid through the power valves 18 and 19, and its multiplied effect caused by the positive feed back of pressure in the upper chamber 5 upon the annular piston area 20, and the negative feed back of the pilot pressure under the pilot valve 14. At low frequencies the multiplication takes place to provide adequate damping of the body resonance. At higher frequencies it is not multiplied because of the filtering effect of the inertia of the control mass 9 and the intervening spring 15. It is for this reason that the size of the power valves 18 and 19 is chosen to yield the necessary damping for the higher frequency resonance between the unsprung mass and the tire.

This invention thus provides a simplified power stabilizer, or shock absorber, for vehicles which offers great resistance to disturbances which would move the vehicle body and at the same time offers lower resistance than before to movement of the wheels. The device moreover causes the body of the vehicle to bank properly when going into turns so as not to throw the passengers sidewise as before. The invention resides primarily in the novel features which are responsible for obtaining this performance with greater simplicity than was possible with previous equipment.

I claim as my invention:

1. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve, a floating control mass for controlling said pilot valve, linear resilient means interposed between said control mass and said pilot valve, damping means associated with said control mass, separate damping means associated with said pilot valve, and mechanically separate pressure supply and pressure discharge valves for said hydraulic actuator, said pressure supply and pressure discharge valves being controlled by said pilot valve.

2. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a single seated pilot valve, a floating control mass for controlling said pilot valve, linear resilient means interposed between said control mass and said pilot valve for linearizing the characteristic of said pilot valve, damping means associated with said control mass, separate damping means associated with said pilot valve, and pressure supply and pressure discharge valves for said hydraulic actuator, said pressure supply and pressure discharge valves being controlled by said pilot valve.

3. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a single seated pilot valve for determining a control pressure, a floating control mass for controlling said pilot valve, linear resilient means interposed between said control mass and said pilot valve for linearizing the characteristic of said pilot valve over substantially the full range of pressure of said power source, pressure supply and pressure discharge valves for said hydraulic actuator, said pressure supply and pressure discharge valves being controlled by said control pressure and so proportioned as to regulate the pressure in said actuator in a one to one relationship with said control pressure.

4. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve for determining a control pressure above and below a quiescent pressure, said pilot valve being actuated in one direction by said control pressure, means for obtaining a separately determined fixed pressure substantially equal to said quiescent pressure, said pilot valve being actuated in the opposite direction by said fixed pressure, pressure supply and pressure discharge valves for said hydraulic actuator, said pressure supply and pressure discharge valves being controlled by said control pressure.

5. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve for determining said force, a floating control mass for controlling said pilot valve, linear resilient means interposed between said control mass and said pilot valve, damping means associated with said control mass, separate damping means associated with said pilot valve, means for subjecting said control mass to forces proportional to the relative velocity of said sprung and unsprung masses, and pressure supply and pressure discharge valves for said hydraulic actuator, said pressure supply and pressure discharge valves being controlled by said pilot valve.

6. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve for determining said force, a floating control mass for controlling said pilot valve, linear resilient means interposed between said control mass and said pilot valve for increasing the required travel of said control mass, damping means associated with said control mass, separate damping means associated with said pilot valve, and pressure supply and pressure discharge valves for said actuator, said pressure supply and pressure discharge valves being controlled by said pilot valve, said floating control mass being responsive to both vertical and lateral accelerations of said sprung mass.

7. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve for determining the force of said actuator, a floating control mass for controlling said pilot valve, resilient means interposed between said control mass and said pilot valve for limiting the response of said valve to frequencies in the range of the vehicle suspension frequencies, and pressure supply and pressure discharge valves for said actuator, said pressure supply and pressure discharge valves being controlled by said pilot valve.

8. In a power shock absorber for a vehicle having sprung and unsprung masses, a hydraulic power source, a hydraulic actuator connected to said sprung and unsprung masses for producing force between said masses, an inertia controller mounted on said sprung mass and connected hydraulically to said power source and to said actuator, said inertia controller including a pilot valve for determining the force of said actuator, a floating control mass for controlling said pilot valve, resilient means interposed between said control mass and said pilot valve, damping means associated with said control mass, separate damping means associated with said pilot valve, said resilient means in combination with the inertia of said control mass comprising a mechanical filter of the proper proportions to limit the response of said power shock absorber to frequencies in the range of the vehicle suspension frequencies, and pressure supply and pressure discharge valves for said actuator, said pressure supply and pressure discharge valves being controlled by said pilot valve.

9. In a power shock absorber for a vehicle having sprung and unsprung masses, a hydraulic power source, a hydraulic actuator having a piston and cylinder connected, respectively, to the unsprung mass and sprung mass and being hydraulically connected to the hydraulic power source for producing force between said masses in two concurrently acting stages, a single seated pilot valve mounted on said sprung mass to provide a first stage force, a floating control mass, also mounted on the sprung mass, for controlling the operation of said pilot valve, linear resilient means interposed between said control mass and said pilot valve for linearizing, as the second stage force, the operating characteristics of said pilot valve over substantially the full range of pressure of said power source, and pressure supply and pressure discharge valves for said hydraulic actuator, said pressure supply and pressure discharge valves being controlled by said pilot valve.

10. In a power shock absorber for a vehicle having sprung and unsprung masses, a hydraulic power source, a hydraulic actuator having a piston and a cylinder connected respectively to said unsprung and sprung masses, and being hydraulically connected to said power source for producing force between said masses, a pilot valve mounted on said sprung mass for determining the force of said actuator, a spring supported floating control mass, also mounted on said sprung mass, for controlling said pilot valve, resilient means interposed between said control mass and said pilot valve for limiting the response of said valve to frequencies in the range of the vehicle suspension frequencies, and pressure supply and pressure discharge valves for said actuator, said pressure supply and pressure discharge valves being controlled by said pilot valve, damping means associated with said control mass, and temperature responsive means coacting with said damping means to maintain the damping effect on the movement of the control mass substantially constant regardless of changes in temperature.

11. In a power shock absorber for a vehicle having sprung and unsprung masses, a hydraulic power source having a supply line and a return line, a hydraulic actuator having a fluid pressure chamber, said actuator being connected mechanically to said sprung and unsprung masses for producing force between said masses, by variations of fluid pressure in said fluid pressure chamber, inertia controlled valve means for determining the pressure in said fluid pressure chamber, said inertia controlled valve means including a pilot valve, a pressure supply valve, and a pressure discharge valve, said inertia controlled valve means having only three external hydraulic connections, one to said supply line, one to said return line, and one to said fluid pressure chamber, said inertia controlled valve means including means for preventing the pressures in either said supply line or said return line from having any appreciable force effect upon said pilot valve.

12. In a power shock absorber for a vehicle having sprung and unsprung masses, a hydraulic power source, a hydraulic actuator connected mechanically to said sprung and unsprung masses for producing force between said masses, inertia controlled valve means interconnecting said hydraulic power source and said hydraulic actuator, said inertia controlled valve means including a moveable mass, a pivot and a resilient support for said movable mass, the position of said resilient support being displaced both vertically and horizontally from said pivot and subject to small displacements having a horizontal component as said moveable mass undergoes movement, thus producing a toggle action whereby the variations in the force of said resilient support are compensated by opposite variations in the leverage of said resilient support.

References Cited by the Examiner

UNITED STATES PATENTS

| | | | |
|---|---|---|---|
| 2,161,687 | 6/1939 | Shoepf et al. | |
| 2,212,426 | 8/1940 | Mitereff. | |
| 2,492,990 | 1/1950 | Hanna | 267—11 |
| 2,901,239 | 8/1959 | Sethna | 267—8 |
| 2,976,052 | 3/1961 | Hanna | 280—112 |
| 3,085,443 | 4/1963 | Manteuffel | 73—505 |
| 3,101,002 | 8/1963 | Van Zyl | 73—514 |
| 3,141,659 | 7/1964 | Lyon | 267—11 |

ARTHUR L. LA POINT, *Primary Examiner.*

EUGENE G. BOTZ, *Examiner.*

M. S. SALES, W. B. WILBER, *Assistant Examiners.*